(12) United States Patent
Shinohara et al.

(10) Patent No.: US 11,590,716 B2
(45) Date of Patent: Feb. 28, 2023

(54) METHOD FOR MANUFACTURING MOLDED ARTICLE

(71) Applicant: Toray Industries, Inc., Tokyo (JP)

(72) Inventors: Kotaro Shinohara, Ehime (JP); Masato Honma, Ehime (JP); Yoshiki Takebe, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 386 days.

(21) Appl. No.: 17/040,757

(22) PCT Filed: Mar. 27, 2019

(86) PCT No.: PCT/JP2019/013235
§ 371 (c)(1),
(2) Date: Sep. 23, 2020

(87) PCT Pub. No.: WO2019/189384
PCT Pub. Date: Oct. 3, 2019

(65) Prior Publication Data
US 2021/0016474 A1 Jan. 21, 2021

(30) Foreign Application Priority Data

Mar. 30, 2018 (JP) .............................. JP2018-067926

(51) Int. Cl.
*B29C 70/46* (2006.01)
*B29C 43/58* (2006.01)
*B29C 70/16* (2006.01)

(52) U.S. Cl.
CPC .............. *B29C 70/46* (2013.01); *B29C 43/58* (2013.01); *B29C 70/16* (2013.01); *B29C 2043/5825* (2013.01)

(58) Field of Classification Search
CPC .... B29C 2043/3602; B29C 2043/5825; B29C 43/021; B29C 43/36; B29C 43/52;
(Continued)

(56) References Cited

U.S. PATENT DOCUMENTS

2015/0073086 A1 3/2015 Isono et al.

FOREIGN PATENT DOCUMENTS

JP 2005050948 A 2/2005
JP 2009198145 A 9/2009
(Continued)

OTHER PUBLICATIONS

International Search Report and Written Opinion for International Application No. PCT/JP2019/013235, dated Jul. 2, 2019, with partial translation, 4 pages.

*Primary Examiner* — Philip C Tucker
*Assistant Examiner* — Evan T Hulting
(74) *Attorney, Agent, or Firm* — RatnerPrestia

(57) ABSTRACT

A method is described for manufacturing a molded product having a recessed/protruding part from a molded substrate (A) including reinforcing fibers and a matrix resin by press molding, the method comprising: a step (I) of placing the molded substrate (A) between molds including an upper mold and a lower mold and deforming the molded substrate (A) in an in-plane direction by heating and pressing the molds; and a step (II) of deforming the molded substrate (A) in an out-of-plane direction by depressurizing the molds subsequent to the step (I), wherein a deformation rate ratio T represented by the following formula (1) is within a range of 0.1 to 1:

$$T = X/Z \qquad (1)$$

where X and Z are as defined.

15 Claims, 5 Drawing Sheets

(58) Field of Classification Search
CPC ......... B29C 43/54; B29C 43/58; B29C 70/16; B29C 70/46; B29K 2105/12
See application file for complete search history.

(56) References Cited

FOREIGN PATENT DOCUMENTS

| | | | |
|---|---|---|---|
| JP | 2013216029 | A | 10/2013 |
| JP | 2014208419 | A | 11/2014 |
| JP | 2017110532 | A | 6/2017 |

[Fig. 1]
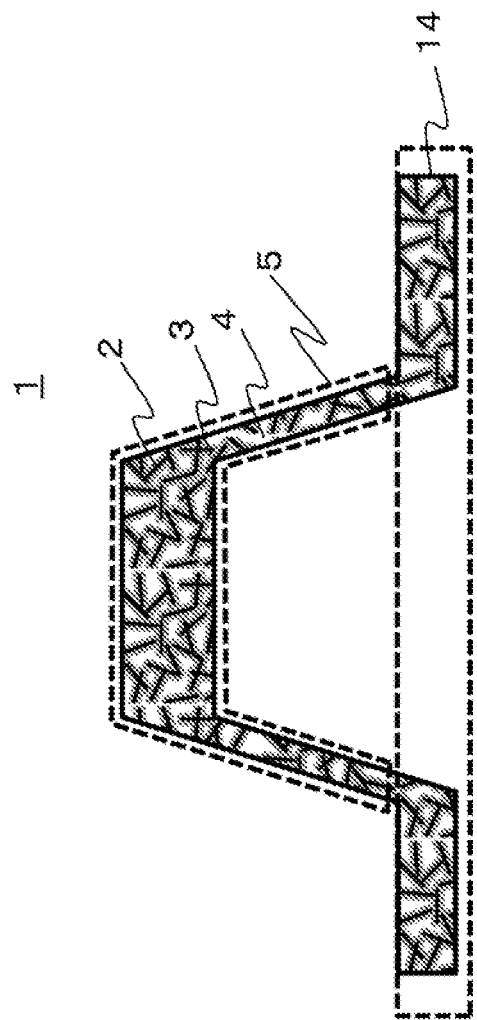

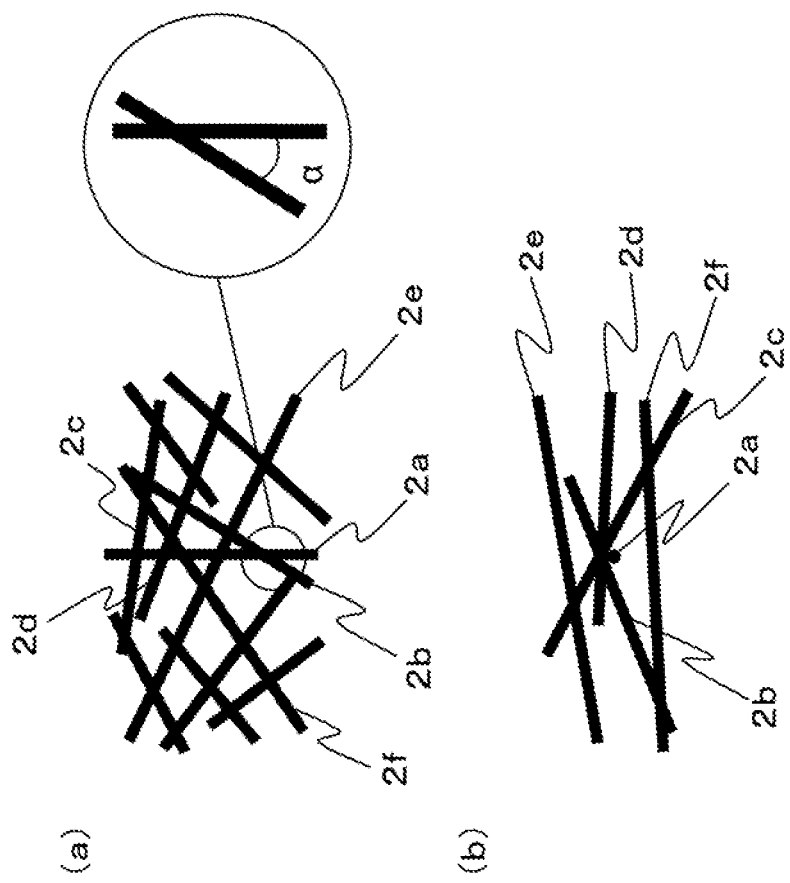
[Fig. 2]

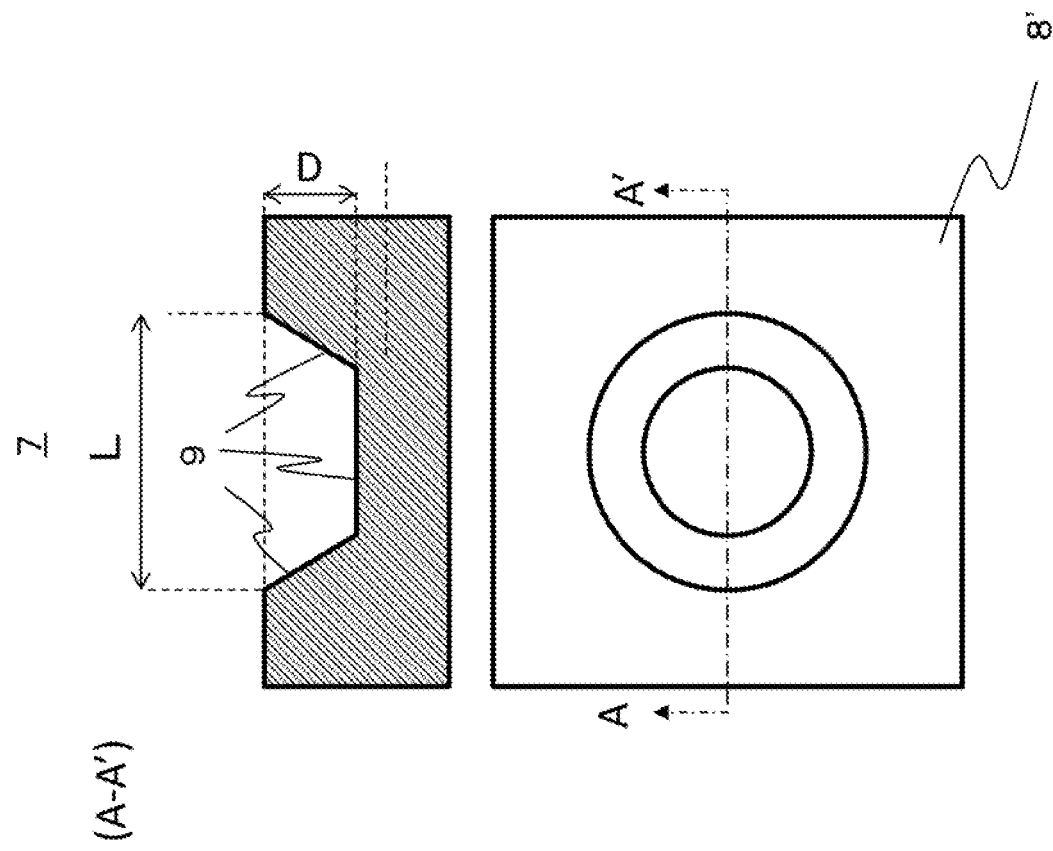
[Fig.3]

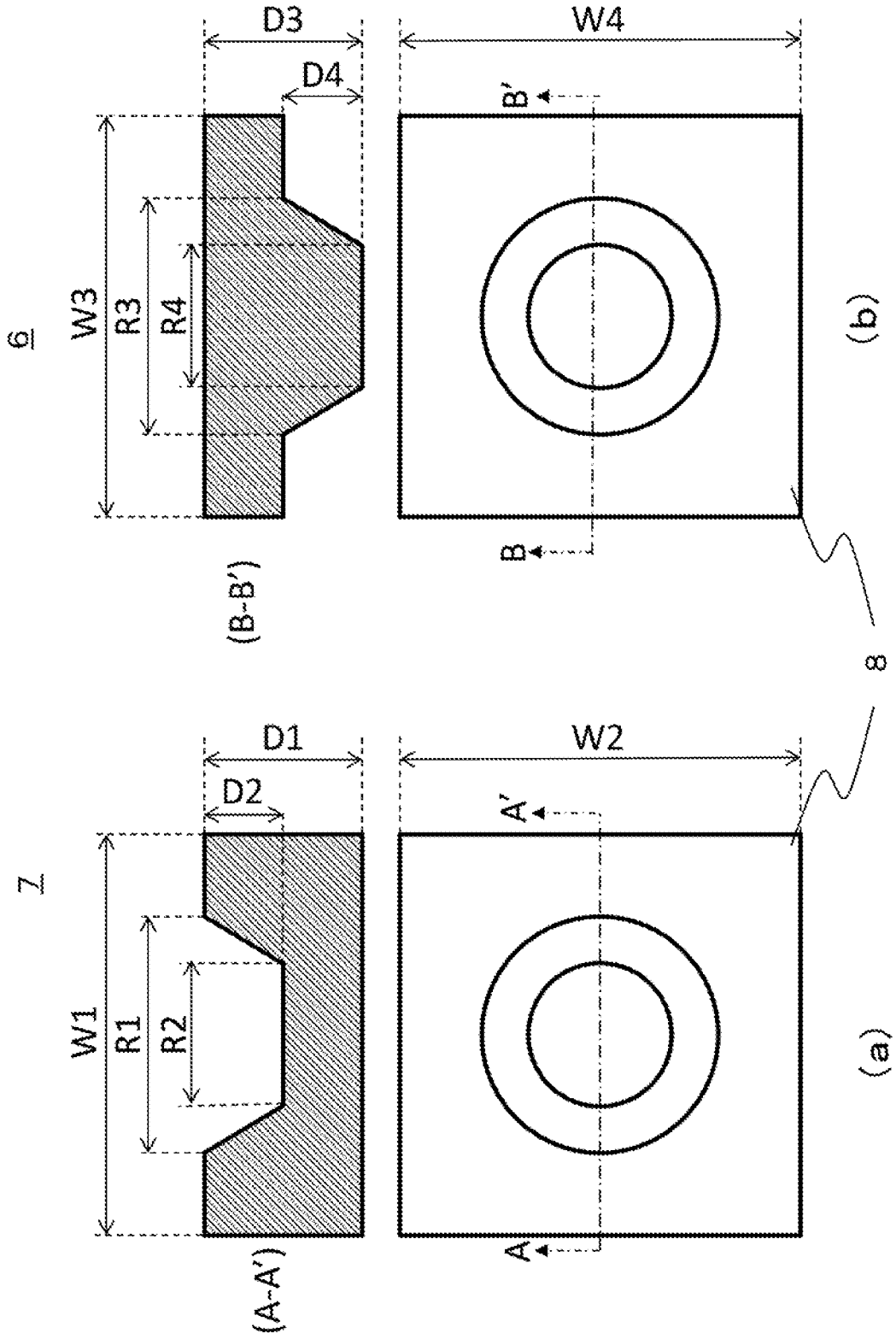
[Fig.4]

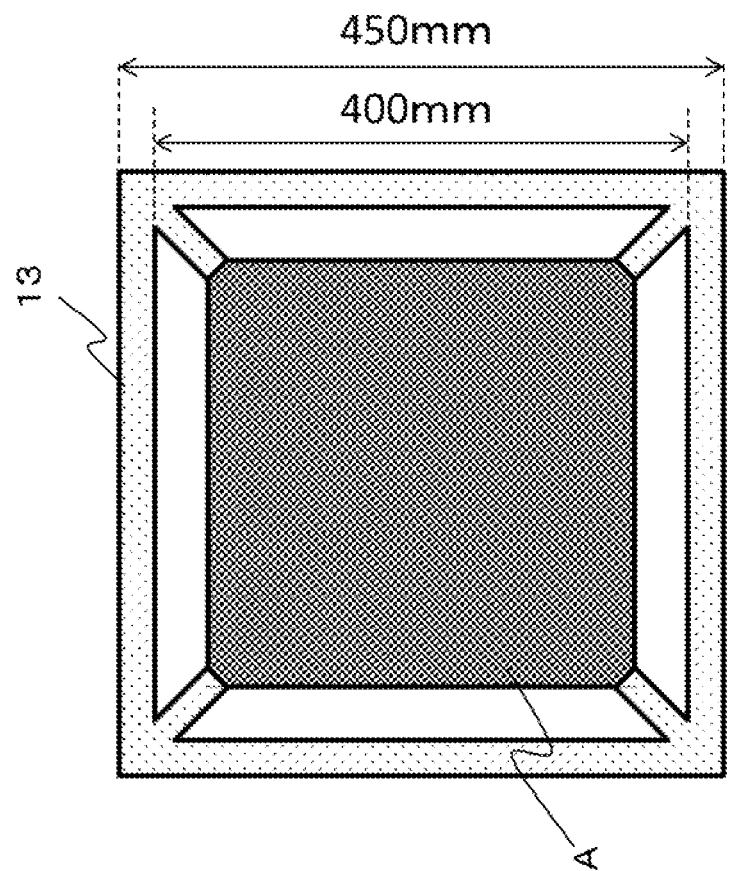
[Fig.5]

METHOD FOR MANUFACTURING MOLDED ARTICLE

CROSS REFERENCE TO RELATED APPLICATIONS

This is the U.S. National Phase application of PCT/JP2019/013235, filed Mar. 27, 2019, which claims priority to Japanese Patent Application No. 2018-067926, filed Mar. 30, 2018, the disclosures of these applications being incorporated herein by reference in their entireties for all purposes.

FIELD OF THE INVENTION

The present invention relates to a method for manufacturing a molded product from a molded substrate including reinforcing fibers and a matrix resin.

BACKGROUND OF THE INVENTION

In recent years, market demands for lightweight properties are increasing year by year for industrial products such as automobiles, aircraft, and sporting products. To meet these demands, a press-molded product using a fiber-reinforced resin which is light and has excellent mechanical properties is widely used for various kinds of industrial applications. Specifically, to satisfy lightweight properties, use of structures having voids is widely studied (see Patent Document 1). Here, press molding is a method for subjecting various materials exemplified by a metal, a plastic material, and a ceramic material and the like to deformations such as bending, shearing and compression deformations using a processing machine, a mold, and a tool and the like, to perform molding and processing. The press molding is different from injection molding, and is excellent in molding large-sized members. The following molding method is well known (Patent Documents 2 and 3). In press molding of a molding material using reinforcing fibers and a thermoplastic resin, the molding material preheated to a melting temperature or higher so that it is in a softened state is supplied between a mold having a recessed part and a mold having a protruding part. Subsequently, the molding material is press-molded to obtain a molded product having a desired shape.

Patent Documents

Patent Document 1: International Publication 2017/110532
Patent Document 2: Japanese Patent Laid-open Publication No. 2009-196145
Patent Document 3: Japanese Patent Laid-open Publication No. 2014-208419

SUMMARY OF THE INVENTION

Structures used for industrial products are required to have a recessed/protruding part such as a boss rib shape or a deep drawn part in order to improve the mechanical properties and functionality of parts. In press molding, not only a flat plate shape but also precise shaping of the structures to the recessed part of the mold are required, but Patent Document 1 does not necessarily satisfy the demands.

In the invention described in Patent Document 2, the press molding of the fiber-reinforced thermoplastic resin molding material makes it difficult to shape the molding material to the recessed part of the mold, which causes problems that wrinkles occur in the surface appearance of the obtained molded body, and the thickness of the molded product is decreased by shaping the molding material to the recessed part of the mold.

Furthermore, many techniques relate to molded products which includes no voids, but in this case, the lightweight properties are not satisfied. From the above, it has been imperative to provide a press-molded product which is light and has a complicated shape.

Therefore, the present invention has been made in view of the above problems, and an object thereof is to provide a method for manufacturing a press-molded product including reinforcing fibers and a matrix resin, having improved appearance quality such as wrinkles, and lightweight properties, and having a recessed/protruding part.

In order to solve the above-mentioned problems, the present invention has the following configurations.

(1) A method for manufacturing a molded product having a recessed/protruding part from a molded substrate (A) including reinforcing fibers and a matrix resin by press molding,
the method comprising:
a step (I) of placing the molded substrate (A) in one of molds including an upper mold and a lower mold and deforming the molded substrate (A) in an in-plane direction by heating the molded substrate and pressing the molded substrate in the mold; and
a step (II) of deforming the molded substrate (A) deformed in the in-plane direction in an out-of-plane direction by depressurizing the mold subsequent to the step (I),
wherein a deformation rate ratio T represented by the following formula (1) is within a range of 0.1 to 1:

$$T = X/Z \qquad (1)$$

an in-plane deformation rate $X = \{$(a surface area of a recessed part of the mold having the recessed part)/(a projected area of an opening of the recessed part of the mold having the recessed part, the opening being projected in the out-of-plane direction of the molded substrate (A), which is a raw material)$\}^{1/2}$,
an out-of-plane deformation rate $Z =$ (a maximum thickness of the molded product)/(a thickness P of the molded substrate (A)),
the thickness $P =$ (a mass of the molded substrate (A))/(an apparent density)/(an area of the molded substrate (A)).

(2) The method for manufacturing a molded product, wherein the out-of-plane deformation rate Z is 1.5 or more.

(3) The method for manufacturing a molded product according to any one of the above, wherein the molded substrate (A) is obtained by laminating a plurality of molded substrates including the reinforcing fibers and the matrix resin.

(4) The method for manufacturing a molded product according to any one of the above, further comprising a step (0) of heating the molded substrate (A) to (a melting temperature Ta of the matrix resin) or higher before the step (I).

(5) The method for manufacturing a molded product according to any one of the above, further comprising a step (III) of cooling the molded substrate (A) to $\{$(a melting temperature Ta of the matrix resin)$-10°$ C.$\}$ or lower simultaneously with the step (II) or after completion of the step (II).

(6) The method for manufacturing a molded product according to one of the above, wherein the molded substrate (A) is molded by gripping at least two places in at least one layer thereof.

(7) The method for manufacturing a molded product according to any one of the above,
wherein:
the molded substrate (A) is in a sheet form; and
an area of the molded substrate (A) is equal to or greater than the projected area of the recessed part of the mold in the out-of-plane direction of the molded substrate (A).

(8) The method for manufacturing a molded product according to any one of the above, wherein, when a maximum linear distance in the opening of the recessed part of the mold in a cross section of the mold is L, and a depth of the recessed part is D, D/L>0.2 is set.

(9) The method for manufacturing a molded product according to any one of the above, wherein the reinforcing fibers are carbon fibers, and have a mass average fiber length of 1 to 15 mm.

(10) The method for manufacturing a molded product according to any one of the above, wherein the reinforcing fibers are in a nearly monofilament form.

(11) The method for manufacturing a molded product according to any one of claims 1 to 10, wherein the reinforcing fibers are randomly dispersed.

(12) The method for manufacturing a molded product according to any one of the above, wherein the matrix resin is a thermoplastic resin.

(13) The method for manufacturing a molded product according to any one of the above, wherein the molded product has voids, and the voids are included in the molded product in a rate within a range of 10 to 97% by volume.

(14) The method for manufacturing a molded product according to any one of the above, wherein, when a bending elastic modulus of the molded product is Ec and a density of the molded product is ρ, specific bending stiffness represented by $Ec1/3 \cdot \rho-1$ is within a range of 3 to 20, and the bending elastic modulus Ec of a portion is 3 GPa or more.

(15) The method for manufacturing a molded product according to any one of the above, wherein
an elongation rate Y of the molded substrate (A) before and after the pressing satisfies the following formula (2):

$$X \geq Y > 1 \qquad (2).$$

BRIEF DESCRIPTION OF THE DRAWINGS

FIG. 1 is a cross-sectional view of an example of a molded product according to the present invention.

FIG. 2 is a schematic view showing an example of a dispersed state of reinforcing fibers in a molded product according to the present invention.

FIG. 3 is a plan view and a cross-sectional view showing an example of a mold in a method for manufacturing a molded product according to the present invention.

FIG. 4 is a plan view and a cross-sectional view showing an example of a mold in a method for manufacturing a molded product according to the present invention.

FIG. 5 is a plan view showing an example of a state of a gripping frame and a molded substrate (A) gripped by the gripping frame in a method for manufacturing a molded product according to the present invention.

DETAILED DESCRIPTION OF EMBODIMENTS OF THE INVENTION

Hereinafter, a molded product according to the present invention will be described with reference to FIG. 1.

A molded product 1 according to the present invention includes a recessed/protruding part 5. The molded product 1 is obtained by press-molding a molded substrate (A) including reinforcing fibers 2 and a matrix resin 3. The molded product 1 includes the reinforcing fibers 2 and the matrix resin 3.

Reinforcing Fibers

Examples of the types of the reinforcing fibers include metal fibers formed of aluminum, brass, and stainless and the like, PAN-based, rayon-based, lignin-based, and pitch-based carbon fibers, graphite fibers, insulating fibers formed of glass and the like, organic fibers formed of aramid, PBO, polyphenylene sulfide, polyester, acrylic, nylon, and polyethylene and the like, and inorganic fibers formed of silicon carbide and silicon nitride and the like.

One of these fibers may be used alone, or two or more of them may be used in combination. Among them, PAN-based, pitch-based, and rayon-based carbon fibers, which have excellent specific strength and specific stiffness, are preferably used from the viewpoint of a weight reduction effect. From the viewpoint of increasing the thermal conductivity of the molded product, PAN-based, pitch-based, and rayon-based carbon fibers or metal fibers are preferable. From the viewpoint of increasing the economical efficiency of the obtained molded product, glass fibers are preferably used. In particular, in view of the balance between mechanical properties and economical efficiency, carbon fibers and glass fibers are preferably used in combination. Furthermore, from the viewpoint of enhancing the impact absorbency and shapeability of the obtained molded product, aramid fibers are preferably used. In particular, in view of the balance between mechanical properties and impact absorbency, carbon fibers and aramid fibers are preferably used in combination. From the viewpoint of increasing the conductivity of the obtained molded product, reinforcing fibers coated with a metal such as nickel, copper, or ytterbium can also be used. Among these, PAN-based carbon fibers, which have excellent mechanical properties such as strength and elastic modulus, can be more preferably used.

A surface treatment may be applied to these fibers. Examples of the surface treatment include a coating treatment with a metal as a conductor, a treatment with a coupling agent, a treatment with a sizing agent, a treatment with a binder, and an adhesion treatment for an additive.

The form of the reinforcing fibers in the molded product may be any of a continuous reinforcing fiber having a length similar to that of the molded substrate (A) itself and a discontinuous reinforcing fiber with a finite length cut into a predetermined length. From the viewpoint of easily impregnating the reinforcing fibers with the matrix resin and being able to easily adjust the amount thereof, a discontinuous reinforcing fiber is preferable. At this time, the mass average fiber length of the reinforcing fibers is preferably 1 to 15 mm. As a result, the reinforcing efficiency of the reinforcing fibers can be increased, whereby excellent mechanical properties are imparted to the molded product. The matrix resin component of the molded product is removed by a method such as burning off or eluting, and 400 remaining reinforcing fibers are selected at random. The lengths thereof are measured down to 10 μm, and the mass average fiber length can be calculated as the average length thereof.

When the reinforcing fiber is discontinuous, it is preferable that the reinforcing fiber is a fineness strand having less than 500 single reinforcing fiber yarns. Hereinafter, the state of the fineness strand is referred to as a nearly monofilament form. The configuration of the reinforcing fiber is likely to shape the molded substrate (A) into a complicated shape, and deform the molded substrate (A) in an out-of-plane direction when the molded substrate (A) is molded by applying an external force to the molded substrate (A). Here, the out-of-plane direction refers to the thickness direction of the surface of a material of interest, that is, a vertical direction. The in-plane direction refers to the direction of the surface of a material of interest.

The nearly monofilament is desirably dispersed in monofilaments, that is, in single yarns.

Being dispersed in nearly monofilament or in monofilament means that, for a reinforcing fiber arbitrarily selected in the molded product, the rate of single filaments having a two-dimensional orientation angle of 1° or more (hereinafter, also referred to as a fiber dispersed rate) is 80% or more, and in other words, that a bundle in which two or more single filaments in the molded product are in contact with each other to be parallel to each other is less than 20%. Therefore, here, the mass fraction of a fiber bundle having a filament number of 100 or less at least in the reinforcing fibers particularly preferably corresponds to 100%.

Furthermore, it is particularly desirable that the reinforcing fibers are randomly dispersed. In such an aspect, the molded substrate (A) is less likely to tear during shaping, which provides improved shapeability and uniformly forms small-sized voids in the molded product when the voids are formed. In the state wherein the reinforcing fibers are randomly dispersed, the arithmetic average value of two-dimensional orientation angles of reinforcing fibers randomly selected in the molded product is preferably 30° to 60°. The two-dimensional orientation angle is an angle formed by a single filament of the reinforcing fiber and a single filament crossing this single filament, and is defined as an angle on an acute angle side within a range of 0° to 90° among angles formed by the single filaments crossing each other.

This two-dimensional orientation angle will be further described with reference to the drawings. FIG. 2 is a schematic view showing an example of a dispersed state of reinforcing fibers in a molded product according to the present invention. FIG. 2(a) is a diagram viewed from a plane direction, and FIG. 2(b) is a diagram viewed from a thickness direction. In FIGS. 2(a) and 2(b), when a single filament 2a is used as a reference, the single filament 2a crosses other single filaments 2b to 2f. Here, the crossing means a state where a single filament as a reference is observed to cross other single filaments on a two-dimensional plane to be observed, does not necessarily require the single filament 2a and the single filaments 2b to 2f to be in contact with each other, and does not exclude a state where the single filament 2a is observed to cross the single filaments 2b to 2f when viewed in a projected manner. That is, focusing on the single filament 2a as the reference, all the single filaments 2b to 2f are objects for which the two-dimensional orientation angle is evaluated. In FIG. 2(a), the two-dimensional orientation angle is an angle α on the acute angle side within a range of 0° to 90° among the two angles formed by the two crossing single filaments.

A method for measuring the two-dimensional orientation angle is not particularly limited. For example, a method can be exemplified which observes the orientation of the reinforcing fibers from the surface of a structure element, for which means similar to the method for measuring the two-dimensional contact angle described above can be employed. The average value of the two-dimensional orientation angles can be measured by the following procedure. The average value of the two-dimensional orientation angles is measured for all the single filaments (the single filaments 2b to 2f in FIG. 2) crossing a single filament selected at random (the signal filament 2a in FIG. 2). When there are a large number of other single filaments crossing a single filament, an arithmetic average value measured by selecting 20 other crossing single filaments at random is substituted. This measurement is repeated a total of five times with reference to other single filaments, and its arithmetic average value is calculated as the arithmetic average value of the two-dimensional orientation angles.

The reinforcing fibers are dispersed in nearly monofilament or/and in a random manner, whereby the performance given by the reinforcing fibers dispersed in nearly monofilaments described above can be increased to the maximum. The in-plane deformability and out-of-plane deformability of the molded substrate (A) can be enhanced. From this viewpoint, the fiber dispersion ratio of the reinforcing fibers is desirably 90% or more, and more desirably closer to 100%. The arithmetic average value of the two-dimensional orientation angles of the reinforcing fibers is desirably within a range of 40° to 50°, and more desirably closer to 45°, which is an ideal angle. As a preferable range of the two-dimensional orientation angle, any of the above upper limit values may be an upper limit, and any of the above lower limit values may be a lower limit.

As described above, the volume content of the reinforcing fibers in the molded product is preferably 0.5 to 55% by volume. When the volume content of the reinforcing fibers is less than 0.5% by volume, the reinforcing effect caused by the reinforcing fibers may be unable to be sufficient. Meanwhile, when the volume content of the reinforcing fibers is more than 55% by volume, the volume content of the matrix resin relative to the reinforcing fibers is relatively low, so that it may be unable to bind the reinforcing fibers in the molded product together to make the reinforcing effect of the reinforcing fibers sufficient and to satisfy the mechanical properties, especially bending properties of the molded product. When the volume content of the reinforcing fibers exceeds 55% by volume, the rate of the reinforcing fibers in the molded substrate (A) increases, so that the molded substrate (A) may be apt to tear while the molded substrate (A) is shaped to the recessed part of the mold exemplified in FIG. 3 during press molding. Therefore, the appearance quality of the molded product tends to be unable to be satisfied.

Matrix Resin

Here, examples of the type of the matrix resin include thermoplastic resins and thermosetting resins. The matrix resin may be a mixture of a thermosetting resin and a thermoplastic resin.

Examples of the thermoplastic resin which can be used as the matrix resin in the present invention include the following:

thermoplastic resins selected from polyesters such as polyethylene terephthalate (PET), polybutylene terephthalate (PBT), polytrimethylene terephthalate (PTT), polyethylene naphthalate (PEN), and liquid crystal polyesters;

polyolefins such as polyethylene (PE), polypropylene (PP), and polybutylene;

polyoxymethylene (POM), polyamide (PA), and polyarylene sulfides such as polyphenylene sulfide (PPS);

polyketone (PK), polyether ketone (PEK), polyether ether ketone (PEEK), polyether ketone (PEKK), and polyether nitrile (PEN); fluorine-based resins such as polytetrafluoroethylene, and liquid crystal polymers (LCP).

(these are generally crystalline resins);

"styrene-based resins, polycarbonate (PC), polymethyl methacrylate (PMMA), polyvinyl chloride (PVC), polyphenylene ether (PPE), polyimide (PI), polyamideimide (PAI), polyetherimide (PEI), polysulfone (PSU), polyether sulfone, and polyarylate (PAR) and the like (these are generally amorphous resins);

Thermoplastic resins such as phenol-based resins, phenoxy resins, polystyrene-based, polyolefin-based, polyurethane-based, polyester-based, polyamide-based, polybutadiene-based, polyisoprene-based, and fluorine-based resins, acrylonitrile-based thermoplastic elastomers, and copolymers and modified products of these.

Among these, polyolefin is preferably used from the viewpoint of the lightweight properties of the obtained molded product; polyamide is preferably used from the viewpoint of the strength thereof; amorphous resins such as polycarbonate and styrene-based resins are preferably used from the viewpoint of the surface appearance thereof; polyarylene sulfides are preferably used from the viewpoint of the heat resistance thereof; polyether ether ketone is preferably used from the viewpoint of the continuous use temperature thereof; and fluorine-based resins are preferably used from the viewpoint of the chemical resistance thereof.

Examples of the thermosetting resin used for the matrix resin include unsaturated polyesters, vinyl esters, epoxy resins, phenol resins, urea resins, melamine resins, thermosetting polyimides, copolymers and modified products of these, and resins obtained by blending at least two of these.

The matrix resin may include impact resistance improvers such as elastomer and rubber components and other fillers and additives as long as the object of the present invention is not impaired. Examples of the fillers and additives include inorganic fillers, fire retardants, conductivity imparting agents, nucleators, ultraviolet absorbers, antioxidants, damping materials, antibacterial agents, insect repellents, deodorants, anti-coloring agents, thermal stabilizers, mold release agents, antistatic agents, plasticizers, lubricants, colorants, pigments, dyes, foaming agents, anti-foaming agents, and coupling agents.

The matrix resin is not particularly limited, but it is integrated with the reinforcing fibers from a film-like, liquid-like, fiber-like, or product-like state to form the molded substrate (A) which is a solid at room temperature. When two or more matrix resins and/or the filler or the additive are used, these may be preliminarily kneaded to form a film, a liquid, a fiber, a multilayer film, a two-phase liquid, a core-sheath fiber, or two or more fibers.

A binder resin may be included in addition to the reinforcing fiber and the matrix resin as long as the object of the present invention is not impaired. The binder resin is preferably selected from a thermoplastic resin and a thermosetting resin from the viewpoint of the adhesiveness between the matrix resin and the reinforcing fibers, sealing the reinforcing fibers, and ensuring the handleability. From the viewpoint of adhesiveness between the matrix resin and the reinforcing fibers, the same type resin as the matrix resin or a resin having compatibility with the matrix resin is selected, and from the viewpoint of ensuring the handleability of the reinforcing fibers, an aqueous solution, dispersion, or emulsion of a thermosetting resin or thermoplastic resin is preferably selected.

Voids

Reference is again made to FIG. 1. The molded product 1 of the present invention includes voids 4 to have improved deformability in an out-of-plane direction with respect to the surface of the molded substrate (A), which is preferable. When the voids 4 are included, the voids 4 are formed by the reinforcing fibers 2 coated with the matrix resin 3 serving as columnar supports and overlapping with each other or crossing each other. For example, it is preferable that, when the molded substrate (A) in which the reinforcing fibers 2 are preliminarily impregnated with the matrix resin 3 is heated to obtain the molded product 1, the melting or softening of the matrix resin 3 along with heating raises the reinforcing fibers 2 to form the voids 4. This phenomenon is based on the property of the reinforcing fibers 2 in the molded substrate (A) in a compressed state by pressing rising by hair raising force caused by their elastic modulus.

The volume content rate of the voids 4 in the molded product 1 is preferably 10 to 97% by volume. When the volume content rate of the voids 4 is small, the density of the molded product 1 is high, so that the lightweight properties may be unable to be satisfied. Meanwhile, when the volume content rate of the voids 4 is large, the thickness of the matrix resin 3 coated around the reinforcing fibers 2 is small, so that the reinforcing of the reinforcing fibers 2 in the molded product 1 may be not sufficiently performed to decrease mechanical properties. The volume content rate here means that the sum of the respective volume content rates of the matrix resin 3, the reinforcing fibers 2, and the voids 4 included in the molded product 1 is defined as 100% by volume.

Molded Product

It is preferable that, when the volume of the entire molded product 1 of the present invention is defined as 100% by volume in the molded product 1, the volume content of the reinforcing fibers 2 is 0.5 to 55% by volume; the volume content of the matrix resin 3 is 2.5 to 85% by volume; and the volume content of the voids 4 is 10 to 97% by volume. From the viewpoint of achieving both mechanical properties and lightweight properties, the volume content of the voids 4 is preferably 20 to 90% by volume, and more preferably 33 to 84% by volume; and as a preferable range of the volume content of the voids 4, any of the above upper limit values may be an upper limit, and any of the above lower limit values may be a lower limit. When the volume content of the matrix resin 3 is too small, it may be unable to bind the reinforcing fibers 2 in the molded product 1 together to make the reinforcing effect of the reinforcing fibers 2 sufficient. As a result, the mechanical properties of the molded product 1 may be unable to be satisfied. Meanwhile, when the volume content of the matrix resin 3 is too large, it may be difficult to have a void structure.

It is preferable that, in the molded product 1, the reinforcing fibers 2 are coated with the matrix resin 3, and the coated thickness of the matrix resin 3 with which the reinforcing fibers 2 is coated is preferably 1 to 15 μm. In the coated state of the reinforcing fibers 2 coated with the matrix resin 3, coating at least intersection points of the single filaments of the reinforcing fibers 2 included in the molded product 1 is sufficient from the viewpoint of the shape stability of the molded product 1 and the easiness and the degree of freedom in thickness control. As a more preferable aspect, the reinforcing fibers 2 are preferably coated with the matrix resin 3 with the above coated thickness. This state means that the surface of the reinforcing fibers 2 is coated with the matrix resin 3 without being exposed. In other words, it means that the reinforcing fibers 2 are coated with the matrix resin 3 like a vinyl cord. As a result, the molded product 1 exhibits excellent shapeability to the recessed part of the mold and excellent out-of-plane deformability without the molded substrate (A) tearing when the matrix resin 3 is softened. In addition, the mechanical properties of the molded product 1 can be sufficiently represented when the matrix resin 3 is solidified, whereby the molded product 1 is light and highly rigid. All of the reinforcing fibers 2 are not required to be coated with the matrix resin 3, and the coated state may be within a range in which the shape stability, compression elastic modulus, bending elastic modulus, and bending strength of the molded product 1 are not impaired. That is, in the present invention, it is preferable that at least a part of the reinforcing fibers 2 in the molded product 1 are coated with the matrix resin 3, and the molded product 1 includes at least a portion in which the coated thickness of the matrix resin 3 is within the above range.

The molded product of the present invention preferably has a specific bending stiffness of 3 to 20, represented by $Ec^{1/3} \cdot \rho^{-1}$, where Ec is a bending elastic modulus and $\rho$ is a density. When the specific bending stiffness is within the above range, the molded product has both a lightweight and a high stiffness. From the viewpoint of having both more excellent lightweight properties and mechanical properties, the specific bending stiffness is preferably 5 to 15, and more preferably 8 to 12. As a preferable range of the specific bending stiffness, any of the above upper limit values may be an upper limit, and any of the above lower limit values may be a lower limit.

The bending elastic modulus Ec of the molded product is preferably 3 GPa or more, and more preferably 6 GPa or more. When the bending elastic modulus Ec of the molded product 1 is less than 3 GPa, the range of use as the molded product 1 is limited, which is not preferable. In order to facilitate the design of the molded product, it is preferable that the bending elastic modulus Ec has an isotropic property, that is, it has the Ec in any direction. The upper limit of the bending elastic modulus Ec is not limited. Generally, in a molded product including reinforcing fibers and a matrix resin, the upper limit is determined by the types of the reinforcing fibers and matrix resin as its constituent components. In the molded product according to the present invention, both when the molded product is used alone and when it is used in combination with another member, a member is designed using the bending elastic modulus Ec of the molded product 1 itself, and 5 GPa is enough for practical use. The bending elastic modulus Ec is measured according to the ISO178 method (1993).

The molded product of the present invention preferably has a density $\rho$ of 0.01 to 1.0 g/cm$^3$. The density $\rho$ of the molded product being more than 1.0 g/cm$^3$ means that the mass of the molded product increases, and as a result, the mass of the product increases, which is not preferable. The density $\rho$ of the molded product varies depending on the reinforcing fibers and matrix resin to be used, and from the viewpoint of maintaining the mechanical properties of the molded product, it is preferably 0.01 g/cm$^3$ or more. In the molded product according to the present invention, both when the molded product is used alone and when it is used in combination with another member, from the viewpoint of lightweight properties, the density of the molded product is preferably 0.01 to 0.8 g/cm$^3$. The range may be a combination of any of the above upper limits and lower limits.

In the present invention, to the extent that the characteristics of the present invention are not impaired, a sandwich structure is also feasible, which uses the molded product or the molded substrate (A) as a core layer and uses a sheet-like intermediate substrate in which continuous reinforcing fibers are impregnated with a matrix resin as a skin layer. When the molded product is formed into such a structure, the intermediate substrate as the skin layer may be preliminarily pressed in a state of being laminated on the molded substrate (A) to form the molded product into a sandwich structure. The sandwich structure may be formed by laminating the substrate as the skin layer on the molded product, followed by integrating. Here, the continuous reinforcing fibers are continuous with a length of 100 mm or more at least in one direction. Many are arranged in one direction to form an aggregate, or what is called a reinforcing fiber bundle, which is continuous across the entire length of the sandwich structure. Examples of the form of the sheet-like intermediate substrate formed of the continuous reinforcing fibers include a cloth including reinforcing fiber bundles formed of many continuous reinforcing fibers, a reinforcing fiber bundle in which many continuous reinforcing fibers are arranged in one direction (a unidirectional fiber bundle), and a unidirectional cloth including this unidirectional fiber bundle. The reinforcing fiber may include a plurality of fiber bundles of the same form, or include a plurality of fiber bundles of different forms. The number of the reinforcing fibers included in one reinforcing fiber bundle is normally 300 to 48,000, and in consideration of the manufacture of prepregs and the manufacture of clothes, the number is preferably 300 to 24,000, and more preferably 1,000 to 12,000.

When the continuous reinforcing fibers are used, lamination with the direction of the reinforcing fibers changed is preferably used in order to control the bending elastic modulus of the molded product. In particular, in order to efficiently increase the elastic modulus and strength of the sandwich structure, it is preferable that continuous reinforcing fibers with fiber bundles aligned in one direction are used, and laminated with the direction of the reinforcing fibers changed.

Method for Manufacturing Molded Product

Subsequently, a method for manufacturing a molded product according to the present invention will be described.

A method for manufacturing a molded product including a recessed/protruding part according to the present invention includes a step (I) of placing a molded substrate (A) including reinforcing fibers and a matrix resin in one of molds including an upper mold 6 and a lower mold 7 and deforming the molded substrate (A) in an in-plane direction by heating the molded substrate (A) and pressing the molded substrate (A) in the mold; and a step (II) of deforming the molded substrate (A) deformed in the in-plane direction in an out-of-plane direction by depressurizing the mold.

Mold

The mold in the present invention will be described with reference to FIG. 4. A mold 8 in the present invention includes two molds, and includes an upper mold 6 of FIG. 4(b) and a lower mold 7 of FIG. 4(a). A lower diagram in FIG. 4(a) is a plan view, and a lower diagram in FIG. 4(b) is a bottom view. Upper diagrams of FIGS. 4(a) and 4(b) are an A-A' cross-sectional view or a B-B' cross-sectional view. As the molded product 1 includes the recessed/protruding part 5 shown in FIG. 1, the lower mold 7 includes a recessed part at one place as shown in FIG. 4, and the other includes a protruding part corresponding to the recessed part. In molding, the recessed part may be formed in the upper mold unlike in the drawing. Here, examples of the recessed/protruding part 5 in the molded product 1 shown in FIG. 1 include a shape which is not formed by at least only a flat plate shape such as a boss shape, a rib shape, a taper part, a deep drawing part, a flange part, a wavy part, or an embossed shape. The upper mold 6 and the lower mold 7 are fixed to a movable upper plate surface 11 of a press molding machine (not shown), and one of them is fixed to a non-movable lower plate surface.

D/L is preferably more than 0.2, where L is a maximum linear distance above an opening of a recessed part 9 of a mold 8' including a recessed part shown in FIG. 3 and D is a depth of the recessed part 9. From the viewpoint of the shape effect of the strength of the molded product, D/L is preferably more than 0.25, and more preferably more than 0.3. Here, the opening means a portion surrounded by the boundary between the recessed part 9 and a flat surface part of the mold, and D is a maximum length connecting two points on the boundary surface. The depth of the recessed part 9 is the maximum depth of the recessed part with an outlet end face of the recessed part 9 as a reference surface. When the upper limit is set within this range, the molded product can have strength secured in the out-of-plane direction of the molded substrate (A). The upper limit is not particularly limited. From the viewpoint of moldability, it is preferably less than 5, and from the viewpoint of the height of molding reproducibility, it is particularly preferably less than 2.

Lamination

The molded substrate (A) in the present invention may include a single layer, or may be obtained by laminating a plurality of molded substrates including reinforcing fibers and a matrix resin. When the molded substrate (A) includes a single layer, the molded substrate (A) is easily handled, which provides improved moldability. Here, the molded substrate (A) is shaped into a recessed/protruding shape by a pressing step to be described later, but the molded substrate (A) is shaped with in-plane deformation, so that the molded substrate (A) has a small thickness. Therefore, the molded substrate (A) includes a plurality of layers, whereby variation in thickness and tears can be prevented, which is preferable.

Holding

In the present invention, it is preferable that the molded substrate (A) is in the form of a sheet, and is molded while being held by a mold or a jig or the like at two or more places. The molded substrate (A) is molded while being held, whereby wrinkles at a boundary part between the flat surface part and the recessed/protruding part can be suppressed, and molding reproducibility is also improved. As a form of holding, a jig such as a spring or a clip may be separately prepared to hold an end part of the substrate, or the end part may be held by a mold mechanism. When the molded substrate (A) includes a plurality of layers, it is more preferable that at least one layer is held, and a layer which is not held is present. The presence of the layer which is not held eliminates the need for the layer which is not held to follow the in-plane deformation of the layer which is held. The layer which is held and the layer which is not held are independently deformed. As a result, a matrix resin of the layer which is not held flows into a place having a thickness decreased by the in-plane deformation to fill the place with the matrix resin, thereby reducing the tears of the molded product. A portion for holding the substrate is not particularly limited, but it is preferable that the end part of the molded substrate (A) is held from the viewpoint of good handleability and ease of elongation. It is preferable that the molded substrate (A) is molded while the molded substrate (A) are held at least two places so that the molded substrate (A) is elongated by holding, and it is more preferable that the molded substrate (A) is held four or more places from the viewpoint of molding reproducibility and extensibility. When the molded substrate (A) includes a plurality of layers, and a part of the layers are held, the layer to be held has suppressed wrinkles and improved appearance quality, whereby the layer to be held preferably forms the design surface of the outermost layer.

Preheating

It is preferable that the molded substrate (A) in the present invention further includes a step (0) of preheating the molded substrate (A) to a temperature equal to or higher than the melting temperature Ta of the matrix resin before the step (I). By subjecting the substrate to the step (I) after being preheated, the shapeability of the molded substrate (A) to the recessed part of the mold is improved.

Preheating means is not particularly limited, and examples thereof include a far-infrared heater, a heating plate, a high temperature oven, and preheating by induction heating.

When the matrix resin includes a thermosetting resin, the melting temperature Ta is preferably the observation temperature of the lowest viscosity±20° C. Since the thermosetting resin has fluidity before being thermoset by heating, the shapeability of the molded substrate (A) to the recessed part of the mold is improved by setting a preheating temperature to a temperature equal to or higher than the melting temperature Ta. Furthermore, from the viewpoint of rapid curability, the preheating temperature is preferably the melting temperature Ta+10° C. or higher.

The minimum viscosity of the thermosetting resin can be evaluated by observing an observation temperature using a rheometer (rotary dynamic viscoelasticity measuring device) at a time point when the viscosity of the thermosetting resin is minimized when a temperature is raised from 40° C. to 250° C. at a rate of 1.5° C./min.

When the matrix resin includes a thermoplastic resin, the melting temperature Ta is set to the melting point (Tm) of the thermoplastic resin, and the preheating temperature is preferably equal to or higher than the melting temperature Ta. When the preheating temperature is set within this range, the thermoplastic resin has fluidity, whereby the molded substrate (A) exhibits excellent shapeability. Furthermore, when a desired molded product has a complicated shape, the preheating temperature is preferably the melting temperature Ta+10° C. or higher in consideration of the decrease of the temperature of the substrate during the transportation of the substrate after preheating from the viewpoint of shapeability. The upper limit is not limited, but it is preferably lower than a temperature at which the thermoplastic resin is thermally decomposed, and more preferably Ta+30° C. or lower. When the upper limit is set within this range, the substrate is not excessively softened when an external force is applied to the substrate during molding, whereby the load is transmitted to uniformly elongate the substrate, which is less likely to cause the substrate to tear.

The melting point (Tm) of the thermoplastic resin can be determined by differential scanning calorimetry (DSC). A peak top of a melting peak in a calorific curve obtained under a condition of a temperature rising rate of 10° C./min is treated as Tm.

A temperature at which the thermoplastic resin is thermally decomposed can be determined by thermo gravimetry (TG). For a sample in which the thermoplastic resin was dried in a vacuum dryer for 12 hours or more, a temperature at which a weight in a weight loss curve obtained under a temperature rising condition of 10° C./min reaches 99% of a temperature rising start weight is treated as the temperature at which the thermoplastic resin is thermally decomposed.

Substrate Placement

The preheated molded substrate (A) is placed between the upper mold and the lower mold, and is subjected to a pressing step. A method for placing the substrate is not particularly limited, but it is preferable that the substrate is directly placed on the lower mold from the viewpoint of easiness of molding. When the substrate is placed using a jig without being brought into contact with the upper mold or the lower mold, heat exchange with the mold can be minimized, which is preferable from the viewpoint of the temperature controllability of the substrate.

When the molded substrate (A) is in the form of a sheet, the area of the substrate is preferably equal to or larger than the projected area of the recessed part of the mold in the out-of-plane direction of the molded substrate (A). By the area of the substrate, in press molding, the molded substrate (A) is withdrawn while being elongated into the recessed part during pressing, to be shaped to the recessed part of the mold, whereby a part of the obtained molded product, particularly a standing wall part, a deep drawn part, or a protruding part or the like is easily formed, which provides improved appearance quality of the obtained molded product.

Heating-Pressing

Subsequently, in the method for manufacturing a molded product according to the present invention, as the step (I), the molded substrate (A) is placed between molds including an upper mold and a lower mold, and the molded substrate (A) is deformed in an in-plane direction by heating and pressing the molds. A movable upper plate surface approaches a non-movable lower plate surface, so that the molds are clamped, and the molded substrate (A) placed between the molds is shaped to the recessed part of the mold. The recessed part refers to a region depressed from the opening of the recessed part. During the shaping, the molded substrate (A) is withdrawn into the recessed part, and is elongated by a stretching force provided by the resistance due to the above-mentioned holding and/or the frictional force with the mold. Paying attention to the form of the recessed part of the mold, the amount withdrawn is calculated as an in-plane deformation rate X as follows.

the In-plane deformation rate X={(a surface area of the recessed part)/(a projected area of an opening of the recessed part, the opening being projected in the out-of-plane direction of the molded substrate (A), which is a raw material)}$^{1/2}$.

The projected area of the opening of the recessed part, the opening being projected in the out-of-plane direction of the molded substrate (A), which is a raw material is the area of a circle outside a double circle in plan view below in the example of FIG. 4(a). The projected area may be the projected area of the molded substrate (A) in the out-of-plane direction when the molded substrate (A) is placed between the molds including the upper mold and the lower mold in the opening of the recessed part.

By calculating such parameters, the degree of the molded substrate (A) deformed in the in-plane direction in the manufacturing process of the molded product having the recessed/protruding part can be evaluated, and serves as an index of the three-dimensionality and out-of-plane mechanical properties of the molded product. The in-plane deformation rate X in the present invention is preferably 1.05 or more from the viewpoint of out-of-plane mechanical properties, and is preferably 5 or less from the viewpoint of the appearance quality of a molded product having no tears. From the viewpoint of the shape effect of the strength of the molded product, the in-plane deformation rate X is more preferably 1.5 or more, and particularly preferably 2.0 or more. From the viewpoint of shapeability, the in-plane deformation rate X is more preferably 4 or less, and particularly preferably 3 or less. As a preferable range of the in-plane deformation rate, any of the above upper limit values may be an upper limit, and any of the above lower limit values may be a lower limit.

Furthermore, regarding the in-plane deformation rate of the molded substrate (A), an elongation rate Y of the substrate due to the holding of the substrate and/or the friction with the mold among the in-plane deformation of the molded substrate preferably satisfies X≥Y>1. From the viewpoint of reducing appearance defects such as wrinkles and tears, 2.0≥Y>1 is preferable. From the viewpoint of maintaining the isotropic property of the substrate while improving the appearance quality, 1.75≥Y>1 is more preferable, and 1.6≥Y≥1.2 is particularly preferable. As a preferable range of the elongation rate Y, any of the above upper limit values may be an upper limit, and any of the above lower limit values may be a lower limit.

When two or more layers are provided in the molded substrate (A), the elongation rates Y of the layers may be different between the recessed part side and the other side of the mold. In such a case, in order to achieve both excellent shapeability to the recessed part of the mold and excellent out-of-plane deformability, it is preferable that the elongation rate Y1 of the molded substrate of the outermost layer on the recessed part side of the mold and the elongation rate Y2 of the molded substrate of the other outermost layer respectively satisfy 2.0≥Y1>1 and 1.3≥Y2>1. From the viewpoint of a more excellent out-of-plane deformation rate, the elongation rate Y2 is more preferably 1.15≥Y2>1.

The elongation rate Y can be measured by a distance between two points plotted on the molded substrate (A) before and after molding. Before the molded substrate (A) is subjected to the step (I), arbitrary two points are marked on the molded substrate (A), and the molded substrate (A) is subjected to molding. Using the distance between the arbitrary two points, a ratio (distance between two points after molding)/(distance between two points before molding) is measured. This measurement is performed at 20 random places on the recessed/protruding part of the molded product, and the arithmetic average value thereof is taken as the elongation rate Y.

It is preferable that the temperature of the mold during pressing is equal to or higher than the melting temperature Ta of the matrix resin so that the preheated molded substrate (A) does not lose its fluidity by being cooled before the mold clamping. More preferably, the temperature of the mold is Ta+20° C. or higher, and by setting the temperature of the mold to this range, the matrix resin flows after the mold clamping, which provides improved surface quality of the molded product.

Depressurizing

Subsequently, in the method for manufacturing a molded product according to the present invention, as the step (II), the molded substrate (A) is deformed in the out-of-plane direction by depressurizing the mold. The step (II) is a step of expanding the molded substrate (A) shaped in the mold obtained in the step (I) by depressurizing the molded substrate (A) and adjusting the thickness in a heated state.

A method for controlling the thickness is not limited as long as the thickness of the molded substrate (A) to be heated can be controlled to a desired thickness, and examples of a preferable method thereof from the viewpoint of simple manufacture include a method for pressing the molded substrate (A) in a state where the molded substrate (A) is sandwiched between two metal plates sandwiching a spacer having a desired thickness, and a method for controlling the thickness of the molded substrate (A) by reducing a pressure applied to the molded substrate (A). By the step, the molded substrate (A) is deformed in the out-of-plane direction. The amount of the molded substrate (A) deformed in the out-of-plane direction at this time is taken as an out-of-plane deformation rate Z, and calculated by the following formula.

the out-of-plane deformation rate Z=(a maximum thickness of molded product)/(an average thickness of the molded substrate (A))

Here, the maximum thickness of the molded product is the maximum value of the thickness of the recessed/protruding part of the molded product after demolding.

The thickness P of the molded substrate (A) is calculated by the following formula.

the thickness P=(a mass of the molded substrate (A))/(an apparent density)/(an area of the molded substrate (A))

In the method for measuring the thickness P, the thickness P is obtained from the apparent density of the molded substrate (A), and the mass and area of the molded substrate (A) used for measuring the density. The apparent density is obtained according to the density measurement method by the in-liquid weighing method described in JIS Z 8807 (2012). Ten test pieces of 10 mm×10 mm are cut out from the molded substrate (A), and the arithmetic average value of the thicknesses p [cm] obtained from the following formula for the test pieces can be set as the thickness P [mm].

the thickness $p$ [cm]=(a mass of the test piece in air [g])/(a density [g/cm$^3$])/1 [cm$^2$]

With such a measuring method, the thickness P of the molded substrate (A) can be calculated even when the molded substrate (A) includes many voids.

A large out-of-plane deformation rate Z means that the molded product is thick, which is advantageous in bending deformation. Therefore, the out-of-plane deformation rate Z is preferably 1.5 or more, and more preferably 1.8 or more. The upper limit is preferably 10 or less, and more preferably 8 or less. As a preferable range of the out-of-plane deformation rate Z, any of the above upper limit values may be an upper limit, and any of the above lower limit values may be a lower limit.

In the present invention, when the in-plane deformation rate of the molded substrate (A) is X and the out-of-plane deformation rate is Z, a deformation rate ratio T represented as X/Z is within a range of 0.1 to 1. When the deformation rate ratio is less than 0.1, the deformation of the molded substrate (A) in the in-plane direction is relatively small, and the deformation of the molded substrate (A) in the out-of-plane direction is large, so that the balance between the recessed/protruding shape and the thickness may be poor to cause poor mechanical properties of the entire molded product as structural design, which is not desirable. Meanwhile, when the deformation rate ratio is more than 1, the molded substrate (A) is relatively largely deformed in the in-plane direction, and the out-of-plane deformation amount of the molded substrate (A) is small. This may cause deteriorated appearance quality such as tears of the recessed/protruding part due to in-plane excessive deformation, and/or the out-of-plane deformation amount may be small to cause poor lightweight properties, which is not desirable. From the viewpoint of satisfying all of shaping into a complex shape, lightweight properties, and mechanical properties, the deformation rate ratio is more preferably 0.125 to 1, still more preferably 0.15 to 0.75, and particularly preferably 0.2 to 0.4. The range may be a combination of any of the above upper limits and lower limits.

Cooling/Demolding

Following the step (II), in a step (III), the mold is cooled, and the molded product is demolded. The cooling step may be performed simultaneously with the step (II). A mold temperature at this time is preferably the melting temperature Ta−20° C. or lower from the viewpoint of handleability.

Use

It is possible to use the molded product for, for example, an electric or electronic device component such as "a personal computer, a display, OA equipment, a portable phone, a portable information terminal, PDA (personal digital assistance such as an electronic organizer), a video camera, acoustic equipment, an optical apparatus, an audio, an air conditioner, lighting equipment, an amusement product, a toy, a housing for other home electric appliances, a tray, a chassis, an interior member, or a case thereof", "various members, various frames, various hinges, various arms, various axles, various wheel bearings, or various beams", "an outer plate or a body component such as a hood, a roof, a door, a fender, a trunk lid, a side panel, a rear end panel, a front body, an under body, various pillars, various members, various frames, various beams, various supports, various rails, or various hinges", "an exterior component such as a bumper, a bumper beam, a mall, an under cover, an engine cover, a current plate, a spoiler, a cowl louver, or an aero part", "an interior component such as an instrument panel, a sheet frame, a door trim, a pillar trim, a handle, or various modules", a structural component for an automobile or two-wheel vehicle such as "a motor component, a CNG tank, or a gasoline tank", a component for automobile or two-wheel vehicle such as "a battery tray, a head lamp support, a pedal housing, a protector, a lamp reflector, a lamp housing, a noise shield, or a spare tire cover", a building material such as "an in-wall member for a noise barrier wall or a soundproof wall", an aircraft component such as "a landing gear pod, a winglet, a spoiler, an edge, a ladder, an elevator, a fairing, a rib, a sheet, or a body for a small unmanned aircraft", and a medical component such as "an artificial limb, a protector, a supporter, a medical device, or a shock absorber". The molded product obtained by the manufacturing method according to the present invention is preferably used for an automobile interior or exterior part, an electric or electronic device housing, a bicycle, a structure material for sport goods, an aircraft interior material, a transport box, and a building material, from the viewpoint of mechanical properties. In particular, the molded product is particularly suitable for a module member including a plurality of components.

EXAMPLES

Hereinafter, the present invention will be described in more detail with reference to Examples.

(1) Density ρ

Cubic test pieces were cut out of any 20 places of a flat surface part of a molded product to be described below, and an apparent density of the molded product was measured with reference to JIS K7222 (2005). The length, width, and thickness of the test piece were measured with a micrometer, and a volume V of the test piece was calculated from the obtained values. A mass M of the cut-out test piece was measured with an electronic balance. The obtained mass M and volume V were substituted into the following formula to calculate a density ρ of the test piece. The 20 densities were averaged.

$$\rho[g/cm^3]=10^3 \times M [g]/V [mm^3]$$

(2) Compressive Strength per Mass

A test piece is prepared by cutting the flat surface part from the molded product. Here, a method for preparing the test piece will be described with reference to FIG. 1. The test piece means a portion of the recessed/protruding part 5 in FIG. 1, and a test piece including the recessed/protruding part 5 can be obtained by cutting an end part of the recessed/protruding part which is a boundary between the recessed/protruding part 5 and the flat surface part 14 out of the molded product 1. For the obtained test piece, compression strength was measured using a universal testing machine, with the end part of the recessed/protruding part being a support side and an apex of the recessed/protruding part being an indenter side. A test speed was 1 mm/min, and compressive strength per mass was calculated according to the following formula using a maximum force $F_m$ reaching at the time of the deformation rate of 50% and the mass M of the test piece. As a measuring device, "Instron®" model 5565 universal material testing machine (manufactured by Instron Japan Co., Ltd.) was used.

$$(\text{Compressive Strength per Mass}) [N/g]=F_m[N]/M[g].$$

(3) Void Ratio

A cube test piece was randomly cut out of each of 5 places of the flat surface part 14 of the molded product, and a section of the molded product exposed on the surface was observed with a scanning electron microscope (SEM) (model S-4800 manufactured by Hitachi High-Technologies Corporation). From the surface of the test piece, ten places were photographed at equal intervals with a 1,000-fold magnification. An area $A_a$ of voids in each image was determined for the image. Furthermore, each void ratio was calculated for each test piece by dividing the void area $A_a$ by the area of the entire image, and the arithmetic average of the five void ratios of the test piece was taken as the void ratio of the molded product.

(4) Appearance of Surface

The recessed/protruding part of the obtained molded product was qualitatively evaluated according to the following evaluation criteria.

A: No unfilled portion, broken portion, and worn portion of the recessed/protruding part 5 in FIG. 1 are present, and the surface appearance of the molded product is excellent.

B: Worn marks are observed in the recessed/protruding part 5 in FIG. 1 although the worn marks have no problem in practical use.

C: The recessed/protruding part 5 in FIG. 1 is unfilled or has holes, which is poor.

(5) Bending Elastic Modulus Ec, Specific Bending Stiffness

Test pieces were cut out of the molded product, and the bending elastic modulus thereof was measured in accordance with ISO 178 method (1993). For the test pieces, the number of measurement n=5 was set, and the arithmetic average value was taken as a bending elastic modulus Ec. As a measuring device, "Instron®" model 5565 universal material testing machine (manufactured by Instron Japan Co., Ltd.) was used. From the obtained results, the specific bending stiffness of the molded product was calculated by the following formula.

$$(\text{Specific bending stiffness}) [MPa^{1/3}/(g/cm^3)]=Ec^{1/3}/\rho$$

(6) Materials and Equipment Used

Carbon Fiber (1)

A copolymer including polyacrylonitrile as a main component was subjected to a spinning treatment, a firing treatment, and a surface oxidation treatment, and a total of 12,000 single yarns were obtained as continuous carbon fibers. The properties of the continuous carbon fibers were as follows.

Single fiber diameter: 7 μm
Density: 1.8 g/cm$^3$
Tensile strength: 4600 MPa
Tensile elastic modulus: 220 GPa.

PP Resin

A sheet (melting point: 160° C.) was produced, which was formed of 80% by mass of unmodified polypropylene resin ("Prime Polypro®" J105G manufactured by PRIME POLYMER Co., Ltd.) and 20% by mass of acid-modified polypropylene resin ("ADMER" QB510 manufactured by Mitsui Chemicals, Inc.). The obtained sheet had a weight per unit area of 100 g/m$^2$.

Fiber-Reinforced Mat (1)

The carbon fibers (1) were cut with a cartridge cutter at 5 mm to obtain chopped carbon fibers. A dispersion liquid formed of water and a surfactant (polyoxyethylene lauryl ether (trade name) manufactured by NACALAI TESQUE, INC.) at a concentration of 0.1% by mass was prepared, and a fiber-reinforced mat was manufactured using the dispersion liquid and the chopped carbon fibers and using a device for manufacturing a fiber-reinforced mat. The manufacturing device includes, as a dispersing tank, a 1000-mm diameter cylinder-shaped container having an opening cock at a lower portion of the container, and includes a linear transport part (inclination angle: 30°) connecting the dispersing tank to a paper-making tank. A stirrer is attached to an opening on an upper surface of the dispersing tank, and it is possible to charge the chopped carbon fibers and the dispersion liquid (dispersion medium) through the opening into the dispersing tank. The paper-making tank includes a mesh conveyor having a 500-mm wide paper-making surface at the bottom, and the mesh conveyor is connected to a conveyor capable of delivering a carbon fiber substrate (paper-making substrate). Paper making was performed with the concentration of the carbon fibers in the dispersion liquid set to 0.05% by mass. The produced carbon fiber substrate was dried in a dry furnace at 200° C. for 30 minutes to obtain a fiber-reinforced mat (1). The weight per unit area of the obtained mat was 50 g/m².

Fiber-Reinforced Mat (2)

The carbon fibers (1) were cut with a cartridge cutter at 5 mm to obtain chopped carbon fibers. The obtained chopped carbon fibers were caused to fall freely from a height of 80 cm to obtain a fiber-reinforced mat (2) in which the chopped carbon fibers were randomly distributed. The weight per unit area of the obtained mat was 50 g/m².

Molded Substrate (1)

The fiber-reinforced mat (1) was used as a fiber-reinforced mat and the PP resin was used as a resin sheet. A laminate was prepared, in which the fiber-reinforced mat (1) and the PP resin were placed in order of [resin sheet/fiber-reinforced mat/resin sheet/fiber-reinforced mat/resin sheet/fiber-reinforced mat/resin sheet/fiber-reinforced mat/fiber-reinforced mat/resin sheet/fiber-reinforced mat/resin sheet/fiber-reinforced mat/resin sheet/fiber-reinforced mat/resin sheet]. Subsequently, a sheet-like molded substrate (1) was obtained through the following steps (i) to (iv).

(i) The laminate is placed in a mold for press molding preheated at 230° C., and the mold is closed.

(ii) Subsequently, after being maintained for 120 seconds, the mold is maintained for additional 60 seconds with a pressure of 3 MPa applied.

(iii) Subsequently, the temperature of the mold is cooled to 50° C. with the pressure maintained.

(iv) The mold is opened, and the molded substrate is taken out of it.

Molded Substrate (2)

A molded substrate (2) was obtained by the same press molding as that of the molded substrate (1) except that a fiber-reinforced mat (1) was used as a fiber-reinforced mat, and a laminated structure was set as [resin sheet/fiber-reinforced mat/resin sheet/fiber-reinforced mat/fiber-reinforced mat/resin sheet/fiber-reinforced mat/resin sheet].

Molded Substrate (3)

A molded substrate (3) was obtained in the same manner as in the molded substrate (1) except that a fiber-reinforced mat (2) was used as a fiber-reinforced mat.

Mold (1)

As a mold used for press molding, a mold (1) was prepared, which had dimensions shown below, and had a combination of a protruding mold having a form shown in FIG. 4(a) and a protruding mold having a form shown in FIG. 4(b).
W1=W2=W3=W4=300 mm
D1=D3=100 mm, D2=D4=29 mm
R1=R3=90 mm, R2=R4=50 mm.

Mold (2)

As a mold used for press molding, a mold (2) was prepared, which had dimensions shown below, and had a combination of a protruding mold having a form shown in FIG. 4(a) and a protruding mold having a form shown in FIG. 4(b).
W1=W2=W3=W4=300 mm
D1=D3=100 mm, D2=D4=49 mm
R1=R3=90 mm, R2=R4=50 mm.

7. Examples and Comparative Examples

Example 1

A mold (1) was used. Molding was performed in a state where a protruding mold as a lower mold was fixed to a non-movable lower plate surface of a press machine, and a protruding mold as an upper mold was fixed to a movable upper plate surface of the press machine.

A molded product was obtained through the following steps (0) to (IV) using the molded substrate (3) as the molded substrate (A). The properties of the obtained molded product are shown in Table 1.

(0) The molded substrate (A) cut into a square of 300 mm by 300 mm is preheated for 120 seconds in an oven including a far-infrared heater until the temperature of the center of the molded substrate in a thickness direction reaches 160° C. The temperature of the oven was adjusted in advance so that the temperature of the molded substrate was 160° C. after 120 seconds. If the temperature is 160° C. after 120 seconds, the temperature may earlier reach 160° C.

(I) Subsequently, the molded substrate (A) is placed on the projected surface of the lower mold of the molds preheated to 180° C. Immediately thereafter, the upper mold is lowered at a speed of 20 mm/s, and the molds are clamped with a pressure of 50 kN, to shape the molded substrate (A).

(II) The molded substrate (A) is shaped by press molding for 120 seconds, and then depressurized. The upper mold is raised, and a metal spacer having a thickness of 1.5 mm is inserted into an end part between the molds.

(III) Then, the upper mold is lowered again, and the temperature of the mold is decreased to 50° C. in a state where the pressure is maintained.

(IV) The upper mold is raised, and the molded product is taken out.

Example 2

A molded product was obtained in the same manner as in Example 1 except that a molded substrate (1) was used as a molded substrate (A). The properties of the obtained molded product are shown in Table 1.

Example 3

A molded product was obtained in the same manner as in Example 2 except that the thickness of the metal spacer in the step (II) was 2.5 mm. The properties of the obtained molded product are shown in Table 1.

Example 4

A molded product was obtained in the same manner as in Example 3 except that the temperature for preheating the substrate in the step (0) was 230° C., and the thickness of the metal spacer in the step (II) was 5.0 mm. The properties of the obtained molded product are shown in Table 1.

Example 5

A molded product was obtained in the same manner as in Example 4 except that a molded substrate obtained by stacking two molded substrates (2) was used as a molded substrate (A). The properties of the obtained molded product are shown in Table 1.

Example 6

A molded product was obtained in the same manner as in Example 5 except that a molded substrate which was obtained by stacking a molded substrate (2) cut into a square of 350 mm by 350 mm and having an end part gripped by an aluminum gripping frame 13 as shown in FIG. 5 and a molded substrate (2) cut into a square of 300 mm by 300 mm and not gripped by the gripping frame was used as a molded substrate (A), and the thickness of the molded product to be obtained was adjusted to 4.8 mm by the metal spacer in the step (II). The properties of the obtained molded product are shown in Table 1.

Comparative Example 1

A molded product was obtained in the same manner as in Example 2 except that a mold (2) was used as a mold. The deep drawn part of the obtained molded product was torn, and the compressive strength of the molded product was also a low value. The properties of the obtained molded product are shown in Table 1.

Comparative Example 2

A molded product was obtained through the following steps (0) to (IV) using a mold (1) as a mold, and three molded substrates (1) cut to φ50 mm as a molded substrate (A). The obtained molded product had a poor appearance due to traces of resin and reinforcing fibers flowing as streaks on the surface thereof. Regarding out-of-plane deformation, a smooth surface did not appear due to the unevenness of the substrate involving flow during pressing. The properties of the obtained molded product are shown in Table 1.

(0) The molded substrate (A) cut into a square of 300 mm by 300 mm is preheated for 120 seconds in an oven including a far-infrared heater until the temperature of the center of the molded substrate in the thickness direction reaches 230° C.

(I) Subsequently, the molded substrate (A) is placed at the center of the lower mold of the molds preheated to 100° C. Immediately thereafter, the upper mold is lowered at a speed of 20 mm/s, and the molds are clamped with a pressure of 1000 kN, to shape the molded substrate (A).

(II) After 120 seconds, the molded substrate (A) is depressurized. The upper mold is raised, and a metal spacer is inserted into an end part between the molds. The thickness of the molded product to be obtained is adjusted to 1.0 mm.

(III) Then, the upper mold is lowered again, and the temperature of the mold is decreased to 50° C. in a state where the pressure is maintained.

(IV) The upper mold is raised, and the molded product is taken out.

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Molded substrate A | — | Molded substrate (3) | Molded substrate (1) | Molded substrate (1) | Molded substrate (1) | Molded substrate (2) | Molded substrate (2) | Molded substrate (1) | Molded substrate (1) |
| Gripping | — | None | None | None | None | None | Presence | Presence | None |
| In-plane deformation rate X | — | 1.25 | 1.25 | 1.25 | 1.25 | 1.25 | 1.25 | 1.47 | 1.25 |
| Elongation rate Y | — | 1.1 | 1.06 | 1.06 | 1.08 | 1.08 | 1.13 | 1.13 | 1.4 |
| Out-of-plane deformation rate Z | — | 1.28 | 1.32 | 2.06 | 4.11 | 4.65 | 4.89 | 1.17 | 1.08 |
| Deformation rate ratio T | — | 0.98 | 0.95 | 0.61 | 0.30 | 0.27 | 0.26 | 1.26 | 1.16 |
| D/L | — | 0.22 | 0.22 | 0.22 | 0.22 | 0.22 | 0.22 | 0.22 | 0.22 |
| Preheating temperature | [° C.] | 160 | 160 | 160 | 230 | 230 | 230 | 230 | 160 |
| Void ratio | — | 22% | 24% | 51% | 76% | 78% | 80% | 15% | 7% |
| Appearance of surface | — | B | B | B | A | A | A | C | C |
| Compressive strength per weight | [N/g] | 21 | 23.5 | 34.5 | 34.2 | 40.3 | 38.8 | 13.1 | 29.7 |
| Density | [g/cm$^3$] | 0.84 | 0.82 | 0.52 | 0.26 | 0.23 | 0.22 | 0.92 | 1.00 |
| Bending elastic modulus Ec | [MPa] | 5.06 | 8.18 | 5.56 | 2.44 | 2.41 | 2.11 | 3.41 | 7.19 |
| Specific bending stiffness | [MPa$^{1/3}$/(g/cm$^3$)] | 2.04 | 2.46 | 3.38 | 5.12 | 5.77 | 5.81 | 1.63 | 1.93 |

8. Consideration

Comparison between Examples 1 and 2 and Comparative Examples 1 and 2 showed that the molded products obtained by the present invention have excellent appearance and specific strength. Particularly, Comparative Example 1 had insufficient shapeability, so that the molded substrate was not sufficiently deformed in the out-of-plane direction even when the metal spacer was inserted. Example 3 showed that a lighter effect can be obtained by further deforming the molded substrate in the out-of-plane direction. In Example 4, it became clear that, by optimizing a preheating condition, the shapeability of the molded substrate (A) for the molded product having a recessed/protruding shape is improved, and the out-of-plane deformation rate is increased and the appearance is improved as compared with Examples 1 to 3. Example 5 showed that the appearance quality of the molded product is further improved by stacking a plurality of molded substrates (A) and subjecting the stacked product to the manufacturing method of the present invention. In Example 6, by molding the molded substrate (A) including the reinforcing fibers and the matrix resin while holding the molded substrate (A), defects such as wrinkles were reduced, and the mass was also reduced, whereby the quality could be improved while the mechanical properties were maintained.

INDUSTRIAL APPLICABILITY

A method for manufacturing a molded product according to the present invention can provide a press-molded product having excellent appearance quality such as wrinkles and lightweight properties.

DESCRIPTION OF REFERENCE SIGNS

A: Molded substrate
1: Molded product
2: Reinforcing fiber
3: Matrix resin
4: Voids
5: Recessed/protruding part
6: Upper mold
7: Lower mold
8: Mold
8': Mold having recessed part
9: Recessed part
10: Press molding machine
11: Movable upper plate surface
12: Non-movable lower plate surface
13: Gripping frame
14: Flat surface part

The invention claimed is:

1. A method for manufacturing a molded product having a recessed/protruding part from a molded substrate (A) including reinforcing fibers and a matrix resin by press molding,
the method comprising:
a step (I) of placing the molded substrate (A) in one of molds including an upper mold and a lower mold and deforming the molded substrate (A) in an in-plane direction by heating the molded substrate and pressing the molded substrate in the mold; and
a step (II) of deforming the molded substrate (A) deformed in the in-plane direction in an out-of-plane direction by depressurizing the mold subsequent to the step (I),
a step (III) of calculating a deformation ratio T using the following formula, wherein the deformation ratio T is within the range 0.1 to 1:

$$T = X/Z \quad (1)$$

an in-plane deformation rate X={(a surface area of a recessed part of the mold having the recessed part)/(a projected area of an opening of the recessed part of the mold having the recessed part, the opening being projected in the out-of-plane direction of the molded substrate (A), which is a raw material)}$^{1/2}$, an out-of-plane deformation rate Z=(a maximum thickness of the molded product)/(a thickness P of the molded substrate (A)),
the thickness P=(a mass of the molded substrate (A))/(an apparent density)/(an area of the molded substrate (A)).

2. The method for manufacturing a molded product according to claim 1, wherein the out-of-plane deformation rate Z is 1.5 or more.

3. The method for manufacturing a molded product according to claim 1, wherein the molded substrate (A) is obtained by laminating a plurality of molded substrates including the reinforcing fibers and the matrix resin.

4. The method for manufacturing a molded product according to claim 1, further comprising a step (0) of heating the molded substrate (A) to a melting temperature Ta of the matrix resin or higher before the step (I).

5. The method for manufacturing a molded product according to claim 1, further comprising a step (IV) of cooling the molded substrate (A) to a melting temperature Ta of the matrix resin−10° C. or lower simultaneously with the step (II) or after completion of the step (II).

6. The method for manufacturing a molded product according to claim 1, wherein the molded substrate (A) is molded by gripping at least two places in at least one layer thereof.

7. The method for manufacturing a molded product according to claim 1,
wherein:
the molded substrate (A) is in a sheet form; and
an area of the molded substrate (A) is equal to or greater than the projected area of the recessed part of the mold in the out-of-plane direction of the molded substrate (A).

8. The method for manufacturing a molded product according to claim 1, wherein, when a maximum linear distance in the opening of the recessed part of the mold in a cross section of the mold is L, and a depth of the recessed part is D, D/L>0.2 is set.

9. The method for manufacturing a molded product according to claim 1,
wherein the reinforcing fibers are carbon fibers, and have a mass average fiber length of 1 to 15 mm.

10. The method for manufacturing a molded product according to claim 1, wherein the reinforcing fibers are in a nearly monofilament form.

11. The method for manufacturing a molded product according to claim 1, wherein the reinforcing fibers are randomly dispersed.

12. The method for manufacturing a molded product according to claim 1, wherein the matrix resin is a thermoplastic resin.

13. The method for manufacturing a molded product according to claim 1, wherein the molded product has voids, and the voids are included in the molded product in a rate within a range of 10 to 97% by volume.

14. The method for manufacturing a molded product according to claim 1, wherein, when a bending elastic modulus of the molded product is Ec and a density of the molded product is ρ, specific bending stiffness represented by $Ec^{1/3} \cdot \rho^{-1}$ is within a range of 3 to 20, and the bending elastic modulus Ec of a portion is 3 GPa or more.

15. The method for manufacturing a molded product according to claim 1, wherein
an elongation rate Y of the molded substrate (A) before and after the pressing satisfies following formula (2):

$$X \geq Y > 1 \quad (2).$$

* * * * *